(12) United States Patent
Zahid et al.

(10) Patent No.: US 10,951,464 B2
(45) Date of Patent: *Mar. 16, 2021

(54) SYSTEM AND METHOD FOR EFFICIENT NETWORK RECONFIGURATION IN FAT-TREES

(71) Applicant: ORACLE INTERNATIONAL CORPORATION, Redwood Shores, CA (US)

(72) Inventors: Feroz Zahid, Oslo (NO); Bartosz Bogdanski, Oslo (NO); Bjørn Dag Johnsen, Oslo (NO); Ernst Gunnar Gran, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/717,166

(22) Filed: Dec. 17, 2019

(65) Prior Publication Data

US 2020/0127887 A1 Apr. 23, 2020

Related U.S. Application Data

(63) Continuation of application No. 16/135,910, filed on Sep. 19, 2018, now Pat. No. 10,536,325, which is a
(Continued)

(51) Int. Cl.
*H04L 12/24* (2006.01)
*H04L 12/751* (2013.01)
(Continued)

(52) U.S. Cl.
CPC ........ *H04L 41/0672* (2013.01); *H04L 41/044* (2013.01); *H04L 41/12* (2013.01);
(Continued)

(58) Field of Classification Search
CPC ... H04L 41/0672; H04L 41/044; H04L 41/12; H04L 45/02; H04L 45/28; H04L 45/24
See application file for complete search history.

(56) References Cited

U.S. PATENT DOCUMENTS

| | | |
|---|---|---|
| 7,698,408 B1 | 4/2010 | Johnsen et al. |
| 7,738,371 B1 | 6/2010 | Rimmer et al. |

(Continued)

OTHER PUBLICATIONS

United States Patent and Trademark Office, Office Action dated Sep. 22, 2017 for U.S. Appl. No. 15/073,022, 14 pages.
(Continued)

*Primary Examiner* — Thai Nguyen
(74) *Attorney, Agent, or Firm* — Tucker Ellis LLP

(57) ABSTRACT

Systems and methods are provided for supporting efficient reconfiguration of an interconnection network having a pre-existing routing. An exemplary method can provide a plurality of switches, a plurality of end nodes, and one or more subnet managers, including a master subnet manager. The method can calculate, via the master subnet manager, a first set of one or more leaf-switch to leaf-switch multipaths. The method can store this first set of one or more leaf-switch to leaf-switch multipaths at a metabase. The method can detect a reconfiguration triggering event, and call a new routing for the interconnection network. Finally, the method can reconfigure the network according to the new routing for the interconnection network.

20 Claims, 10 Drawing Sheets

Related U.S. Application Data continuation of application No. 15/190,764, filed on Jun. 23, 2016, now Pat. No. 10,084,639, which is a continuation-in-part of application No. 15/073,022, filed on Mar. 17, 2016, now Pat. No. 10,033,574.

(60) Provisional application No. 62/136,337, filed on Mar. 20, 2015, provisional application No. 62/137,492, filed on Mar. 24, 2015, provisional application No. 62/163,847, filed on May 19, 2015, provisional application No. 62/201,476, filed on Aug. 5, 2015, provisional application No. 62/261,137, filed on Nov. 30, 2015.

(51) Int. Cl.
*H04L 12/703* (2013.01)
*H04L 12/707* (2013.01)

(52) U.S. Cl.
CPC .............. *H04L 45/02* (2013.01); *H04L 45/24* (2013.01); *H04L 45/28* (2013.01)

(56) References Cited

U.S. PATENT DOCUMENTS

| | | |
|---|---|---|
| 7,774,642 B1 | 8/2010 | Johnsen et al. |
| 7,876,752 B1 | 1/2011 | Rimmer et al. |
| 7,983,194 B1 | 7/2011 | Genetti et al. |
| 8,949,389 B1 | 2/2015 | Rimmer |
| 9,692,660 B2 | 6/2017 | Friedman et al. |
| 2003/0033427 A1 | 2/2003 | Brahmaroutu |
| 2008/0192654 A1 | 8/2008 | Block et al. |
| 2009/0161578 A1 | 6/2009 | Yeung et al. |
| 2011/0228789 A1 | 9/2011 | Jia |
| 2012/0026878 A1 | 2/2012 | Scaglione |
| 2012/0151090 A1* | 6/2012 | Nakashima .......... H04L 49/557 709/238 |
| 2013/0121149 A1 | 5/2013 | Guay et al. |
| 2013/0121154 A1* | 5/2013 | Guay .................... H04L 45/22 370/236 |
| 2013/0124910 A1 | 5/2013 | Guay et al. |
| 2013/0254321 A1 | 9/2013 | Johnsen et al. |
| 2015/0026344 A1 | 1/2015 | Ravinoothala et al. |
| 2015/0172172 A1* | 6/2015 | DeCusatis ............... H04L 45/24 370/219 |
| 2016/0134516 A1 | 5/2016 | Hui et al. |
| 2016/0191425 A1 | 6/2016 | Schlansker et al. |
| 2016/0352824 A1 | 12/2016 | Miwa et al. |

OTHER PUBLICATIONS

United States Patent and Trademark Office, Office Action dated Jan. 30, 2018 for U.S. Appl. No. 15/190,764, 10 pages.

Zahid, et al. "SlimUpdate: Minimal Routing Update for Performance-based Reconfigurations in Fat-Trees", 2015 IEEE International Conference on Cluster Computing, Sep. 2015, pp. 849-856, 8 pages.

\* cited by examiner

SYSTEM AND METHOD FOR EFFICIENT NETWORK RECONFIGURATION IN FAT-TREES

CLAIM OF PRIORITY

This application is a continuation of U.S. patent application entitled "SYSTEM AND METHOD FOR EFFICIENT NETWORK RECONFIGURATION IN FAT-TREES", application Ser. No. 16/135,910, filed on Sep. 19, 2018, which application is a continuation of U.S. patent application entitled "SYSTEM AND METHOD FOR EFFICIENT NETWORK RECONFIGURATION IN FAT-TREES", application Ser. No. 15/190,764, filed on Jun. 23, 2015, which is a continuation-in-part of U.S. patent application entitled "SYSTEM AND METHOD FOR EFFICIENT NETWORK RECONFIGURATION IN FAT-TREES", application Ser. No. 15/073,022, filed Mar. 17, 2016, which claims the benefit of claims the benefit of priority to U.S. Provisional patent application entitled "SYSTEM AND METHOD FOR EFFICIENT NETWORK RECONFIGURATION IN FAT-TREES", Application No. 62/136,337, filed on Mar. 20, 2015; U.S. Provisional patent application entitled "SYSTEM AND METHOD FOR EFFICIENT NETWORK RECONFIGURATION IN FAT-TREES", Application No. 62/137,492, filed on Mar. 24, 2015; U.S. Provisional patent application entitled "SYSTEM AND METHOD FOR EFFICIENT NETWORK RECOGNITION IN FAT-TREES", Application No. 62/163,847, filed on May 19, 2015; U.S. Provisional patent application entitled "SYSTEM AND METHOD FOR EFFICIENT NETWORK RECOGNITION IN FAT-TREES", Application No. 62/201,476, filed on Aug. 5, 2015; and U.S. Provisional patent application entitled "SYSTEM AND METHOD FOR EFFICIENT NETWORK RECOGNITION IN FAT-TREES", Application No. 62/261,137, filed on Nov. 30, 2015; each of which applications are herein incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting efficient reconfiguration of interconnection networks.

BACKGROUND

As the size of the high-performance computing systems grows, the probability of the events requiring network reconfiguration increases. The reconfiguration of interconnection networks, like InfiniBand (IB) networks, often requires computation and distribution of a new set of routes in order to maintain connectivity, and to sustain performance. This is the general area that embodiments of the invention are intended to address.

In large systems, the probability of component failure is high. At the same time, with more network components, reconfiguration is often needed to ensure high utilization of available communication resources. For example, Exascale computing imposes unprecedented technical challenges, including realization of massive parallelism, resiliency, and sustained performance. The efficient management of such large systems is challenging, requiring frequent reconfigurations.

SUMMARY

The reconfiguration of interconnection networks, like InfiniBand (IB) networks, often requires computation and distribution of a new set of routes in order to maintain connectivity, and to sustain performance. Where reconfiguration is required, a routing mechanism computes a new set of routes without taking into account the existing network configuration. The configuration-oblivious re-routing results in substantial modifications to the existing routes, and the reconfiguration becomes more costly as it involves reconfiguring routes between a large number of source-destination pairs.

Systems and methods are provided for supporting efficient reconfiguration of an interconnection network having a pre-existing routing. An exemplary method can provide a plurality of switches, a plurality of end nodes, and one or more subnet managers, including a master subnet manager. The method can calculate, via the master subnet manager, a first set of one or more leaf-switch to leaf-switch multipaths. The method can store this first set of one or more leaf-switch to leaf-switch multipaths in a metabase. The method can detect a reconfiguration triggering event, and call a new routing for the interconnection network. Finally, the method can reconfigure the network according to the new routing for the interconnection network.

DETAILED DESCRIPTION

Figure 1:
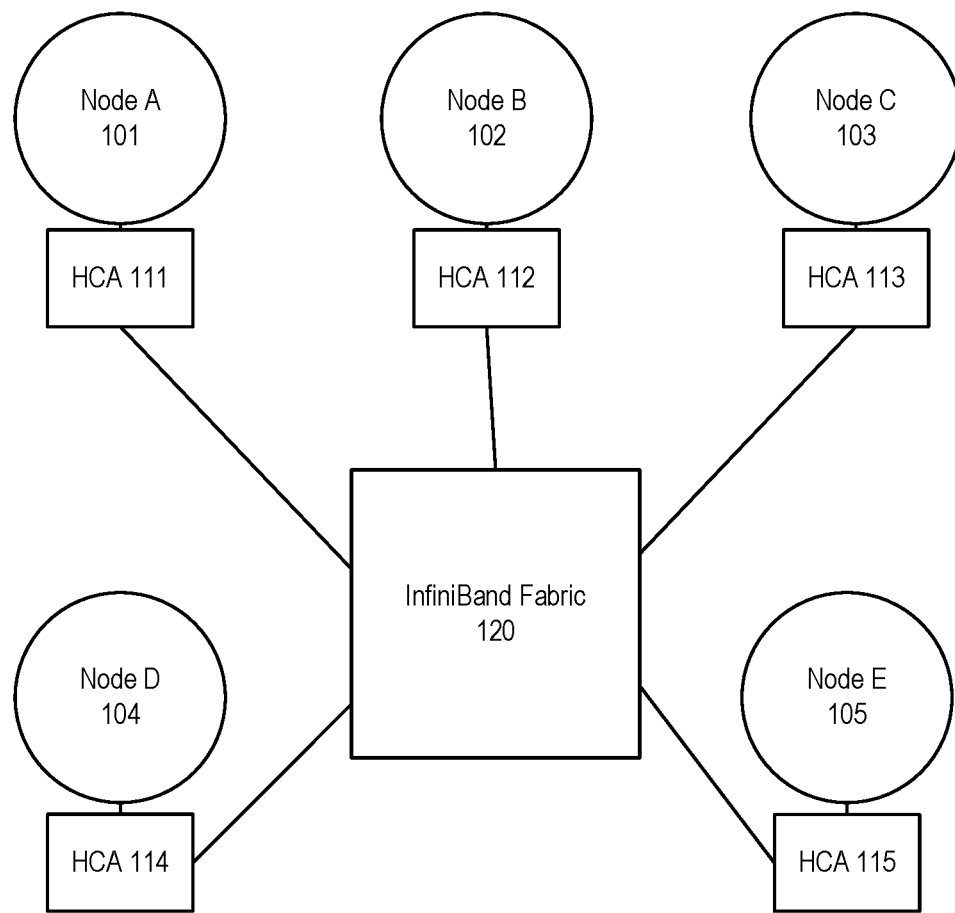
FIG. 1 shows an illustration of an InfiniBand environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods that can support efficient reconfiguration of an interconnection network having a pre-existing routing.

The following description of the invention uses an InfiniBand™ (IB) network as an example for a high performance network. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and optimizing resource usage through live migration.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated subnet device in the subnet. The subnet manager is responsible for configuring, activating and maintaining the IB subnet. Additionally, the SM can be responsible for performing routing table calculations in an IB fabric. Here, for example, the routing of the IB network aims at providing correct routes with proper load balancing between all source and destination pairs in the local subnet. A master subnet manager can also performs periodic sweeps of the subnet to detect any topology changes and reconfigure the network accordingly Through the subnet management interface, the subnet manager exchanges control packets, which are referred to as subnet management packets (SMPs), with subnet management agents (SMAs). The SMAs reside on every IB subnet device. By using SMPs, the subnet manager is able to discover the fabric, configure end nodes and switches, and receive notifications from SMAs.

In accordance with an embodiment, inter- and intra-subnet routing in an IB network can be based on linear forwarding tables (LFTs) stored in the switches. The LFTs are calculated by the SM according to the routing mechanism in use. In a subnet, Host Channel Adapter (HCA) ports on the end nodes and the management port on switches are addressed using local identifiers (LIDs). Each entry in an LFT is indexed by a destination LID (DLID) and contains an output port. Only one entry per LID in the table is supported. When a packet arrives at a switch, its output port is determined by looking up the entry defined by the DLID in the forwarding table of the switch. The routing is deterministic as packets take the same path in the network between a given source-destination pair (LID pair).

Generally, there can be several SMs in a subnet. However, except for the master SM, all other SMs act in standby mode for fault tolerance. In a situation where a master subnet manager fails, however, a new master subnet manager is negotiated by the standby subnet managers.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM (or master SM) can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnet, in which the network changes occurred. Also, the segmenting of a large fabric with routers may limit the reconfiguration scope.

In accordance with an embodiment, IB networks can support partitioning as a security mechanism to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P_Keys). The SM can also configure switches and routers with the partition enforcement tables containing P_Key information associated with the LIDs that are to be forwarded through the corresponding port. Additionally, in a general case, partition membership of a switch port can represent a union of all membership indirectly associated with LIDs routed via the port in an egress (towards the link) direction.

In accordance with an embodiment, for the communication between nodes, Queue Pairs (QPs) and End-to-End contexts (EECs) can be assigned to a particular partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a partition.

An example InfiniBand fabric is shown in FIG. 1, which shows an illustration of an InfiniBand environment 100, in accordance with an embodiment. In the example shown in FIG. 1, nodes A-E, 101-105, use the InfiniBand fabric, 120, to communicate, via the respective host channel adapters 111-115. In accordance with an embodiment, the various nodes, e.g., nodes A-E, 101-105, can be represented by various physical devices. In accordance with an embodiment, the various nodes, e.g., nodes A-E, 101-105, can also be represented by various virtual devices, such as virtual machines.

Recent trends show an exponential increase in computational power over the last twenty years. The Exascale computing power (Exascale implies computational power capable of performing $10^{18}$ double-precision floating-point operations per second, i.e., exaFLOPS) is a next milestone to achieve for the high-performance computing (HPC) community. However, the Exascale computing imposes technical challenges, including realization of massive parallelism, resiliency, and sustained network performance. Because of this, routing plays a crucial role in HPC systems, and optimized routing and reconfiguration strategies are desirable to achieve and maintain optimal bandwidth and latency between nodes of an IB network/subnet.

In HPC clusters, the number of events requiring a network reconfiguration (i.e., reconfiguration triggering events), as well as the complexity of each reconfiguration, increases with growing system size. These reconfiguration events include component failures, node additions/removals, link errors etc. In addition to handling faults, reconfiguration could also be needed to maintain or improve network performance, and to satisfy runtime constraints. For instance, a routing may need an update to optimize for a changed traffic pattern, or to maintain Quality-of-Service (QOS) guarantees. Similarly, energy-saving techniques can rely on server consolidation, virtual machine migrations, and component shutdowns to save power. In all these events, the routing needs to be updated to cope with the change.

Dynamic network reconfiguration in statically routed IB networks requires computation and distribution of a new set of routes to the switches, implemented by means of the linear forwarding tables (LFTs). The subnet manager (SM) employs a routing mechanism to compute new LFTs reflecting the updated topology information. In general, the routing mechanism calculates new paths without considering the existing routes in the network. Such configuration-oblivious routing calculation might result in substantial modifications to the existing paths between large numbers of source-destination (SD) pairs. As a large part of the network is affected by the routing update, the dynamic reconfiguration often requires costly operations to ensure a deadlock-free transition between the old and the new routing. The transition is carefully planned to make sure that the existing traffic flows are not affected. Moreover, the reconfiguration time increases proportionally to the number of path updates to the switches. For these reasons, dynamic reconfiguration in IB is mainly restricted to fault-tolerance, and performance-based reconfigurations are not well-supported.

Virtual Machines in InfiniBand

During the last decade, the prospect of virtualized HPC environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device pass-through techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand (IB), certain cloud functionality, such as live migration of virtual machines (VMs), still remains an issue due to the complicated addressing and routing schemes used in these solutions.

The traditional approach for connecting IB devices to VMs is by utilizing SR-IOV with direct assignment. However, to achieve live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree Topologies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, towards the roots of the topology. The fatter links can help to avoid congestion in the upper-level switches and the bisection-bandwidth is maintained.

Figure 2:
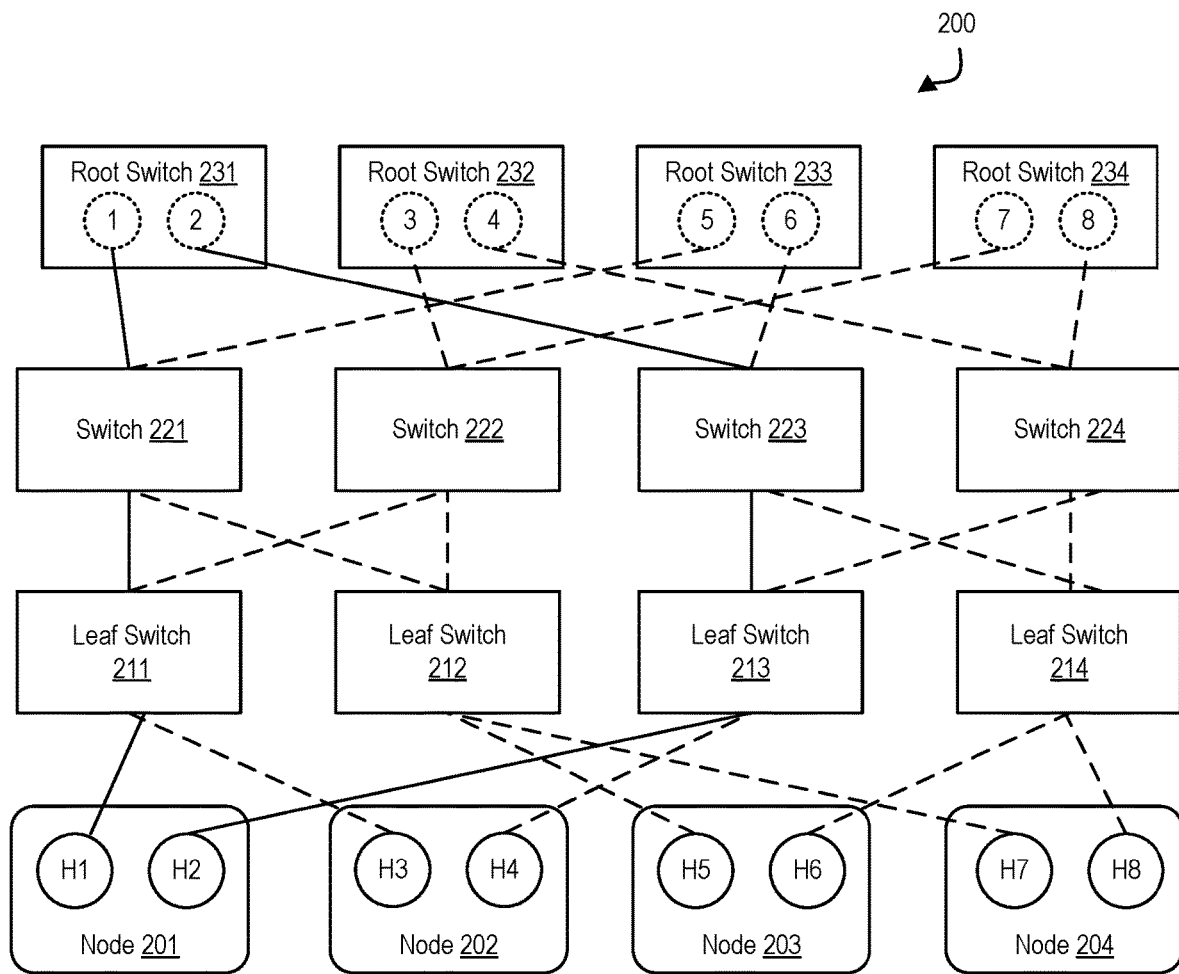
FIG. 2 shows an illustration of a tree topology in a network environment, accordance with an embodiment.

FIG. 2 shows an illustration of a tree topology in a network environment, in accordance with an embodiment. As shown in FIG. 2, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more levels of intermediate switches, such as switches 221-224.

Also as shown in FIG. 2, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing mechanism for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select a least-used port each time a new route is added. If there are multiple ports connecting the same two switches, then these ports form a port group. In that case, the least loaded port of the least loaded port group is selected to add a new route.

The initial idea behind fat-trees was to employ fatter links, which is links with more available bandwidth between nodes, as the network moves toward the roots of the topology. The fatter links help to avoid congestion in the upper-level switches and the bisection-bandwidth is maintained. Different variations of fat-trees include k-ary-n-trees, Extended Generalized Fat-Trees (XGFTs), Parallel Ports Generalized Fat-Trees (PGFTs), and Real Life Fat-Trees (RLFTs).

A k-ary-n-tree is an n level fat-tree with $k^n$ end nodes and $n \times k^{n-1}$ switches, each with 2 k ports. Each switch has an equal number of up and down connections in the tree, except for the root switches. The XGFT extends k-ary-n-trees by allowing both different number of up and down connections for the switches, and different number of connections at each level in the tree. The PGFT definition further broadens XGFT topologies and permits multiple connections between switches. A large variety of topologies can be defined using XGFTs and PGFTs. However, for practical purposes, RLFT, which is a restricted version of PGFT, is introduced to define fat-trees commonly found in today's HPC clusters. A RLFT uses the same port-count switches at all levels in the fat-tree.

Despite the widespread use, some issues have been identified with fat-tree routing. For example, the fat-tree routing algorithm selects the current least-loaded port every time a new path is added to a switch LFT. However, this is not sufficient to maintain proper load-balancing in imbalanced fat-trees. A potential solution to this is using an upward counter along with a downward counter for port selection to achieve better load balancing in imbalanced fat-trees.

Figure 3:
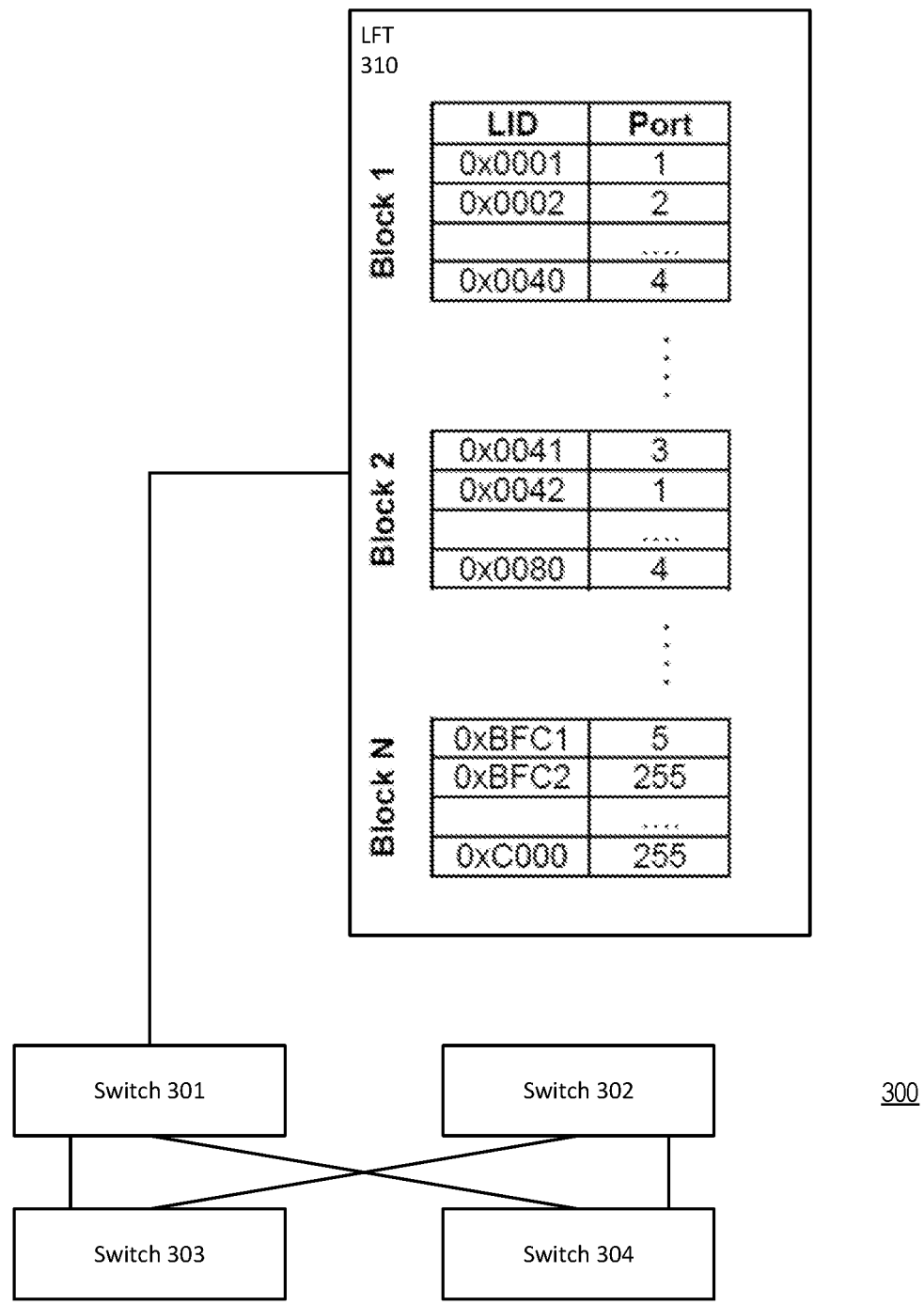
FIG. 3 depicts a block diagram of an InfiniBand subnet showing a linear forwarding table associated with a switch of the InfiniBand subnet, in accordance with an embodiment.

FIG. 3 depicts a block diagram of an InfiniBand subnet showing a linear forwarding table associated with a switch of the InfiniBand subnet, in accordance with an embodiment. In the depicted embodiment, the subnet 300 comprises a plurality of switches, e.g., switch 301, 302, 303, and 304, which can be interconnected. Linear forwarding table 310 is associated with switch 301, and can be used by switch 301 to direct traffic within the subnet. As shown in the figure, the linear forwarding table can be broken down into blocks, and each LID can be associated with an output port. Output port 255 in the figure indicates that the path to such LID is non-existent.

Routing and Network Reconfiguration

In accordance with an embodiment, intra-subnet routing in IB is based on the LFTs stored in the switches. The LFTs are calculated by the SM using the routing algorithm in effect. In a subnet, each Host Channel Adapter (HCA) port on end nodes and all switches are addressed using local identifiers (LIDs). Each entry in an LFT represents a destination LID (DLID), and contains an output port. When a packet arrives at a switch, its output port is determined by looking up the entry corresponding to the DLID in its forwarding table. The routing is deterministic as packets take the same path between a given SD pair.

In accordance with an embodiment, after the subnet is configured as a result of the initial discovery process (heavy sweep), the SM performs periodic light sweeps of the subnet to detect any topology changes using SMP requests to the SMAs. If an SMA detects a change, it forwards a message to the SM with information about the change. As a part of the reconfiguration process, the SM calls the routing algorithm to regenerate LFTs for maintaining connectivity and performance.

In accordance with an embodiment, An LFT is divided in up to 768 blocks, each block representing 64 LIDs and the corresponding output ports. When a new set of routes has been calculated for the subnet, the SM updates the LFTs in the switches using a differential update mechanism. The update mechanism can utilize a block-by-block comparison between existing and new LFTs, to make sure that only modified blocks are sent to the switches.

Figure 4:
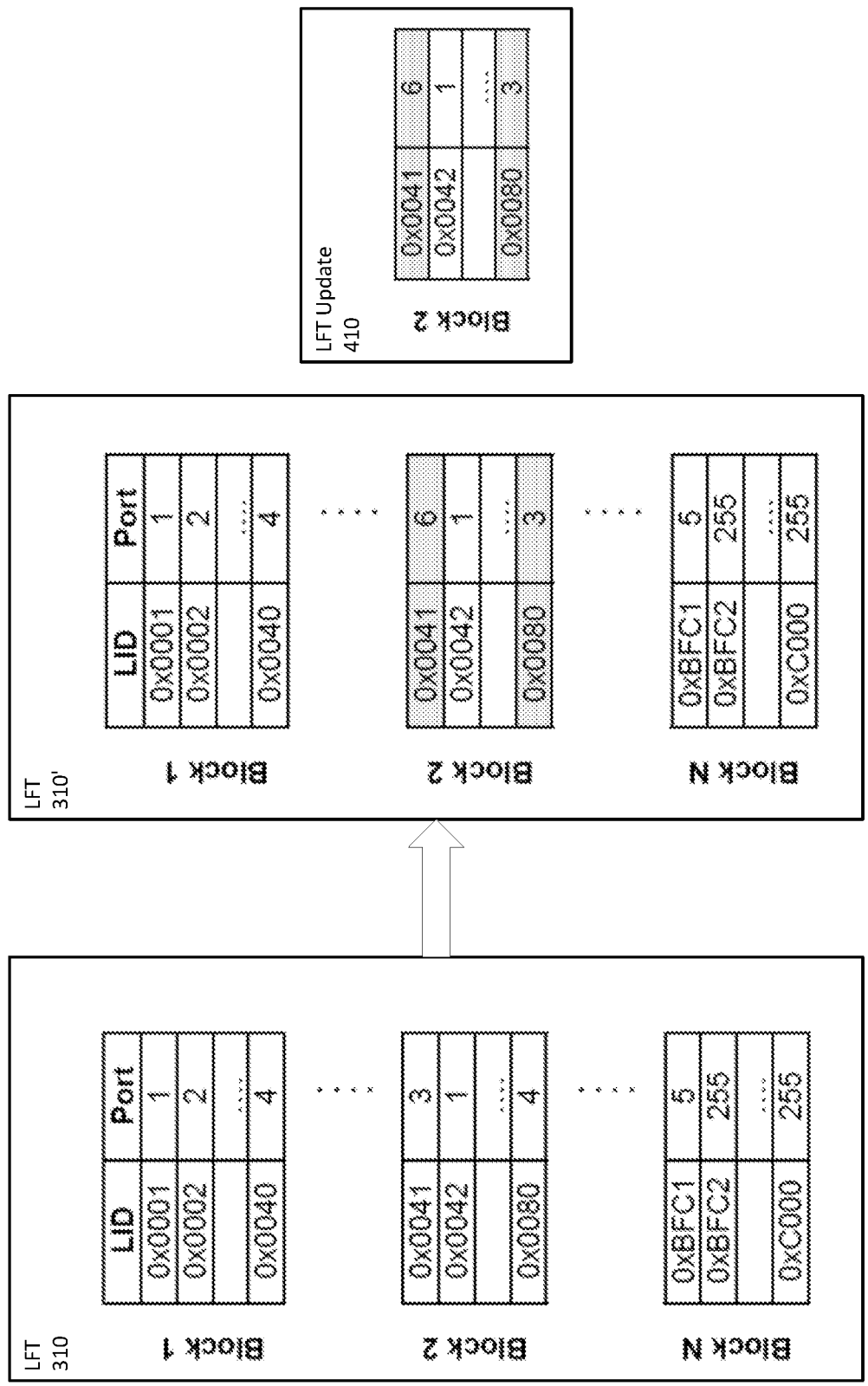
FIG. 4 depicts a block diagram of an updated LFT, in accordance with an embodiment.

FIG. 4 depicts a block diagram of an updated LFT, in accordance with an embodiment. As shown in the figure, LFT 310 is updated to LFT 310', only ports for LIDs 0x0041 and 0x0080 were updated. This means that the LFT update 410, i.e., block 2 with two modified entries is sent to the switch in this example. Note that non-existing paths are marked as directed to port 255.

Minimal Routing Update

In accordance with an embodiment, a minimal routing update (MRU) technique uses the fact that, given a set of end nodes in a topology, multiple routing functions with the same performance and balancing characteristics can be generated. For traffic-oblivious routing in fat-trees, the routing function depends on the node ordering, and a different routing can be obtained by changing the node routing sequence. The MRU technique ensures that a minimum number of existing paths, between source-destination pairs, are modified when a network is reconfigured.

In accordance with an embodiment, node ordering can be changed due to both voluntary and involuntary reasons. For example, a node addition/removal or a routing optimization may cause nodes to be routed in a different sequence. The routing function executed after a change in node ordering might result in a different port selection, for the ends nodes at the switches, than the routing algorithm that ran before the change. Similarly, if a link goes down, the routing sequence for the switches at the affected fat-tree levels is modified, and so is the port selection at those switches. Even the source destination pairs that are not affected by the link failure per se, may still be affected by the change in the routed ports on the switches. Furthermore, node ordering can also be voluntary changed for performance-based reconfigurations, for instance, to keep network utilization optimal.

Figure 5C:
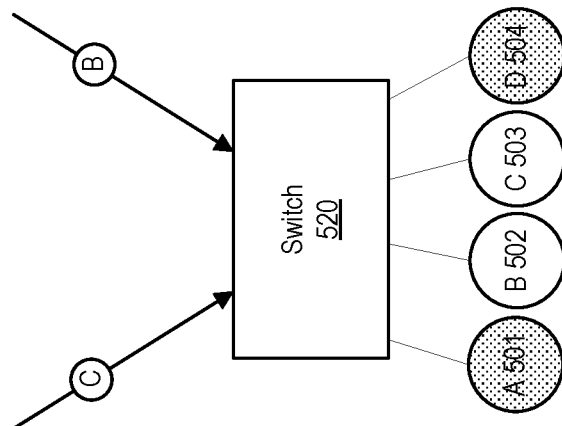
FIGS. 5A-5C illustrate an exemplary minimal routing update on node shutdown, in accordance with an embodiment.
Figure 5B:
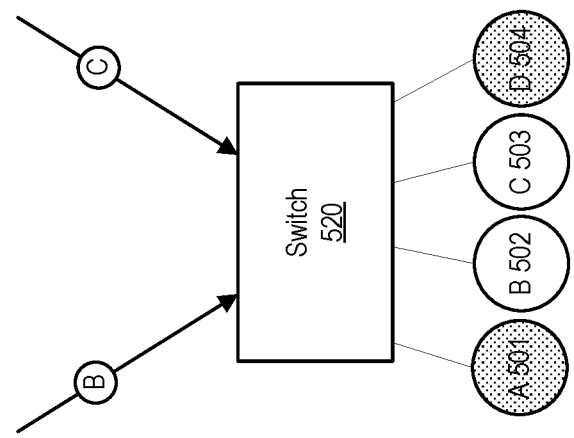
Figure 5A:
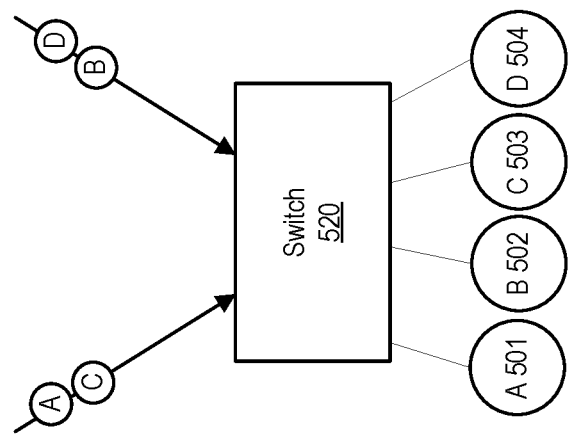

FIGS. 5A-5C illustrate an exemplary minimal routing update on node shutdown, in accordance with an embodiment. More specifically, FIG. 5A shows the downward port selection to a switch 520 connected to four end nodes, node A 401, node B 502, node C 503, and node D 504, with two up-going ports. The port selection is done according to the node order, which is depicted as left to right, (A, B, C, D). That is, the route to node A is directed through the leftmost port, then the route to node B is directed to the rightmost port (in order to keep balance). The route to node C is then directed through the leftmost port, and the route to node D is then routed through the rightmost port, again, to keep the ports in balance.

In accordance with an embodiment, FIG. 5B depicts a situation when two of the nodes, specifically node A 501 and node D 504, are shut down (e.g., the nodes failed). In this situation, using a traditional routing mechanism that assigns ports based upon an index order, the node ordering, i.e., the ordering of nodes B and C, 502 and 503, is changed. The new node ordering affects the port selection for both the remaining active nodes B and C. This can be seen in that now the route to node B is through the leftmost port, and the route to node C is through the rightmost port.

In accordance with an embodiment, a MRU-based routing mechanism can preserve already existing assigned port selections for the end nodes on switches, as long as the assigned routes are still balanced on the available port groups. As shown in FIG. 5C, a system using a MRU mechanism requires no change in the port selection for the remaining active nodes (i.e., Nodes B and C). Even though MRU does not require any change in the existing port selections, both the routings, with and without MRU, are balanced and yield the same performance.

Figure 6C:
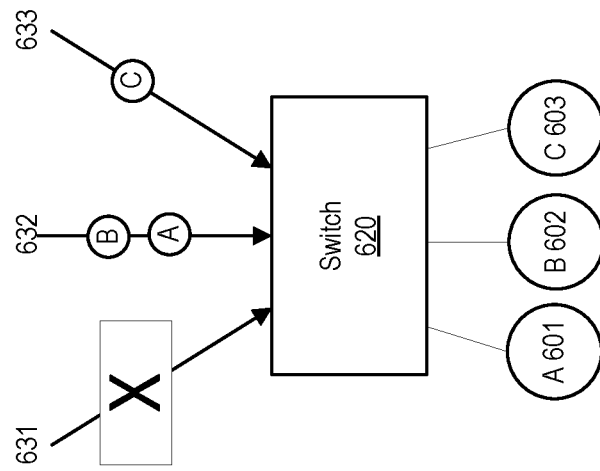
FIGS. 6A-6C illustrate an exemplary minimal routing update on link failure, in accordance with an embodiment.
Figure 6B:
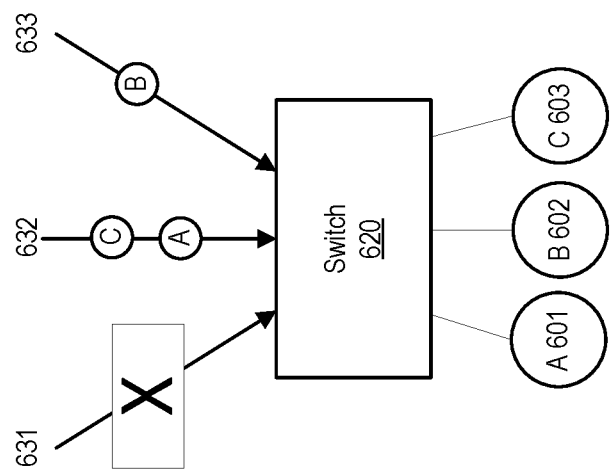
Figure 6A:
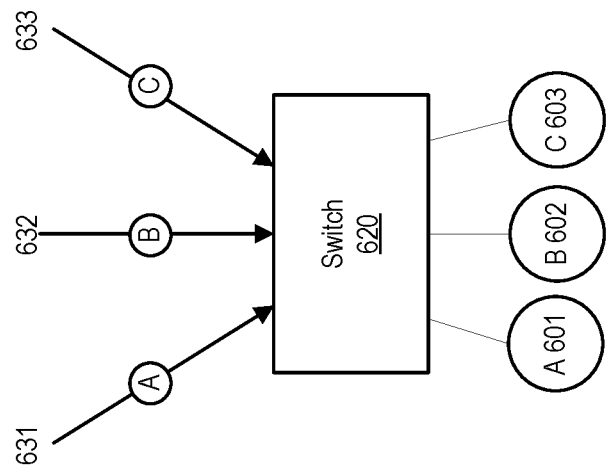

FIGS. 6A-6C illustrate an exemplary minimal routing update on a link failure, in accordance with an embodiment. As shown in FIG. 6A, three nodes, nodes A, B, and C, 601, 602, and 603, communicate through switch 620. There are also three links, link 631, link 632, and link 633, that carry the traffic towards nodes A, B, and C. The original routing, as shown in FIG. 6A, directs traffic to node A through link 631, traffic to node B through link 632, and traffic to node C through link 633.

However, the routing must be reconfigured when a link fails. As shown in FIG. 6B, when link 631 fails, a system utilizing a standard fat tree routing mechanism would reconfigure the subnet as shown. Here, starting with node A (the first in the indexing order, and going from left to right), traffic to node A would be routed through link 632. The traditional mechanism would then route traffic to node B through link 633, and finally, traffic to node C would be routed through link 632. As shown in FIG. 6B, using a standard routing mechanism, traffic to all three nodes would take a different route, which would involve three changes to the LFTs associated with the three upper switches connected to switch 620. (Switch 620 will not have a change in its LFT, but the switches from which the links 631, 632, and 633 are coming will get a change in the LFTs accordingly).

FIG. 6C depicts minimal routing update on link failure, in accordance with an embodiment. After link 631 fails, a minimal routing update mechanism can modify the LFTs such that only the routing for traffic to node A would change to link 632, while the routing for nodes B and C remain the same. Note that the traffic balancing remains the same despite there being two fewer link re-routes when using a MRU mechanism.

In accordance with an embodiment, a SlimUpdate fat-tree routing mechanism can employ the above described MRU technique to preserve the existing routes between SD pairs in a subnet. The mechanism can be completely contained in the subnet manager and does not require any global information other than the LFTs for the switches. The SlimUpdate routing mechanism can generate a routing table which is as similar to the already installed routing table as possible but still preserve the paths on the links, without affecting the route balancing across the topology.

In accordance with an embodiment, pseudo code for the SlimUpdate routing is shown here:

| SlimUpdate |
|---|
| Require: The fabric has been discovered |
| Ensure: The LFTs are generated for the switches |
| 1: set_max_counter_on_ports( ) |
| 2: for each sw ∈ leafSwitches[ ] do |
| 3:   $LFT_{old}$ ⇐ get_lfts( ) |
| 4:   Sort end nodes (lids in $LFT_{old}$ come first) |
| 5:   for each en ∈ endNodes[ ] do |
| 6:     Get lid of en |
| 7:     Set $LFT_{new}$[lid] ⇐ en:hca_port on sw |
| 8:     RouteDowngoingByAscending( ) on sw |
| 9:   end for |
| 10: end for |

In accordance with an embodiment, the routing mechanism (variously referred to herein as "Slim Update routing mechanism" or "Slim Update") is deterministic and the routes are calculated backwards, starting at the destination nodes. For the initial run, when the network does not have any routing set, the SlimUpdate can generate balanced LFTs spreading shortest-path routes across the links in the subnet. The SM distributes the LFTs to the switches, and keeps a copy to enable differential updates later. For subsequent runs when a reconfiguration is required (e.g., when a node goes offline or a link goes down), the routing mechanism can read the SM's LFTs copy, and generate a new routing according to MRU.

In accordance with an embodiment, before assigning routes, SlimUpdate can recursively move up the tree, starting at the leaf switches, and set up a maximum counters on all port groups in the downward direction. The counters are set using the number of end nodes and available up-going ports at each level (see line 1 of the above pseudo code for SlimUpdate). These counters are used to ensure that Slim Update does not compromise on the load-balancing when preserving existing paths.

In accordance with an embodiment, SlimUpdate works recursively to set up LFTs in all switches for the LIDs associated with each end node. For each leaf switch, the algorithm sorts end nodes connected to it in an order ensuring that the nodes which are already routed (i.e., already have LID in the existing LFT), are assigned paths before any newly discovered nodes (line 4 of the above pseudo code for SlimUpdate). The mechanism can then call RouteDowngoingByAscending (line 8 of the above pseudo code for Slim Update) and moves up to select a port at the next level to route the LID, as shown in the below pseudo code for RouteDowngoingByAscending:

| RouteDowngoingByAscending |
|---|
| Require: A switch sw, an end node lid and $LFT_{old}$ <br> 1: counter ⇐ sw.num_allocated_paths( ) <br> 2: current_port ⇐ sw. get_existing_path (lid, $LFT_{old}$) <br> 3: selected_port ⇐ current_port <br> 4: g ⇐ current_port:group( ) <br> 5: mxc ⇐ g.get_max_counter( ) <br> 6: if counter ≥ mxc or selected_port is null then <br> 7:    Get least-loaded ports from sw.UpGroups[ ] as uplist[ ] <br> 8:    selected_port ⇐ upList.get_port_max_guid( ) <br> 9: end if <br> 10: r_sw ⇐ selected_port.get_remote_switch( ) <br> 11: Set LFT[lid] ⇐ selected_port on r_sw <br> 12: increase port counter on selected_port <br> 13: RouteUpgoingByDescending( ) on sw <br> 14: RouteDowngoingByAscending( ) on r_sw |

In accordance with an embodiment, if the maximum allocated paths do not exceed the maximum counter set for the port, the mechanism uses the current port (if any). However, if the maximum counter has already been reached (or the port is faulty), the least-loaded port from the available up-going groups is selected (see lines 7-8 of the above pseudo code for RouteDowngoingByAscending). As long as the load-balancing criteria are maintained and corresponding links are still functional, this technique ensures that the end-nodes take the same path in the tree as was prescribed by the old LFTs. Otherwise, the port selection is based on the least number of already assigned routes to make sure that the load is spread across the available paths.

In accordance with an embodiment, after the down-going port is set for a LID at a switch, SlimUpdate can assign upward ports for it on all the connected downward port groups (except for the one the path originated from) by descending down the tree calling RouteUpgoingByDescending, shown here by pseudo code:

| RouteUpgoingByDescending |
|---|
| Require: A switch sw, an end node lid and $LFT_{old}$ <br> 1: Get port groups from sw.DownGroups[ ] as dwnlist[ ] <br> 2: for each g in dwnList[ ] do <br> 3:    current_port ⇐ g.get_existing_path(lid, $LFT_{old}$) <br> 4:    counter ⇐ g.num_allocated_paths( ) <br> 5:    selected port ⇐ current_port <br> 6:    mxc ⇐ g.get_max_counter( ) <br> 7:    if counter ≥ mxc or selected_port is null then <br> 8:      Get least-loaded ports from g as p <br> 9:      selected_port ⇐ p <br> 10:   end if <br> 11:   r_sw selected_port.get_remote_switch( ) <br> 12:   Set LFT[lid] ⇐ selected_port on r_sw <br> 13:   increase port counter on selected_port <br> 14:   RouteUpgoingByDescending( ) on r_sw <br> 15: end for |

In accordance with an embodiment, the selection of the up-going port is first based on the condition that the node has already been routed and it does not exceed the maximum counter set on the port. If the condition is not met, the least-loaded port in the port group is selected (see lines 8-9 of the above pseudo code for RouteUpgoingByDescending). After a port is selected, the mechanism increases the counter on the selected port. This process is then repeated by moving up to the next level in the tree until all LFTs are set.

In accordance with an embodiment, to make the routing better to cope with faults and other irregularities, the Slim-Update employs a maximum counter on all port groups. This counter is updated to reflect the actual number of paths routable without affecting the balancing of the mechanism.

Embodiments of the systems and methods of the present invention utilize the minimal routing update mechanism (MRU) for re-routing IB based fat-tree topologies. The MRU employs techniques to preserve existing forwarding entries in switches to ensure a minimal routing update, without any routing performance penalty, and with low computational overhead. The methods and systems described herein show a substantial decrease in total route modifications when using MRU while achieving similar or even better performance on most test topologies and reconfiguration scenarios thereby greatly reducing reconfiguration overhead as compared to configuration-oblivious re-routing.

Metabase-Aided Network Reconfiguration

In accordance with an embodiment, a fast network reconfiguration mechanism based on a metabase-aided two-phase routing technique for fat-tree topologies can be provided. The method can enable SlimUpdate to quickly calculate a new set of LFTs in performance-based reconfiguration scenarios. However, in general, the metabase-aided network reconfiguration method can be used to complement any routing mechanism and topology.

In accordance with an embodiment, the routing is to be divided into two distinct phases: calculation of paths in the topology, and allocation of the calculated paths to the actual destinations. For performance based reconfigurations, when reconfiguration is triggered without a topology change, the path calculation phase can be eliminated. This can save on path calculation time, which in turn reduces overall network reconfiguration time in such scenarios. Moreover, once a set of calculated paths has been distributed to the switches, in principle, the re-routing phase can be executed in parallel at the switches further reducing time overhead. In addition, as the number of distinct paths is limited in a given fat-tree topology, the method reduces routing time for oversubscribed topologies. Similarly, systems and methods for metabase-aided network reconfiguration can also improve routing efficiency in virtualized subnets based on virtual switch (vSwitch) architecture.

In accordance with an embodiment, within a fat-tree topology, each compute node is connected to a single leaf-switch (multi-homed nodes connected to redundant leaf switches can be considered as distinct multiple nodes). Because of this, the path between any source-destination pair, as calculated by a fat-tree routing algorithm, is one of the available multiple leaf-switch to leaf-switch paths between corresponding leaf-switches. In exemplary systems and methods for two-phase destination-based routing scheme, paths towards leaf-switches are calculated using multipath routing in the first routing phase. The path calculation can be performed irrespective of the compute nodes connected to the leaf-switches. In the second phase, calculated paths are allocated to the compute nodes, and LFTs are generated or updated accordingly. In addition, the calculated multipath routing blueprint from the first phase, is stored in a metabase and used later for fast network reconfigurations. When a performance based re-routing is triggered, without a topology change, the routing algorithm can simply re-use the calculated paths and assign them to the compute nodes according to its path assignment logic. For instance, paths can be assigned to the compute nodes based on their current network profiles, or in correspondence with a given node permutation (e.g., a MPI (messaging passing interface) node ranks).

Figure 7:
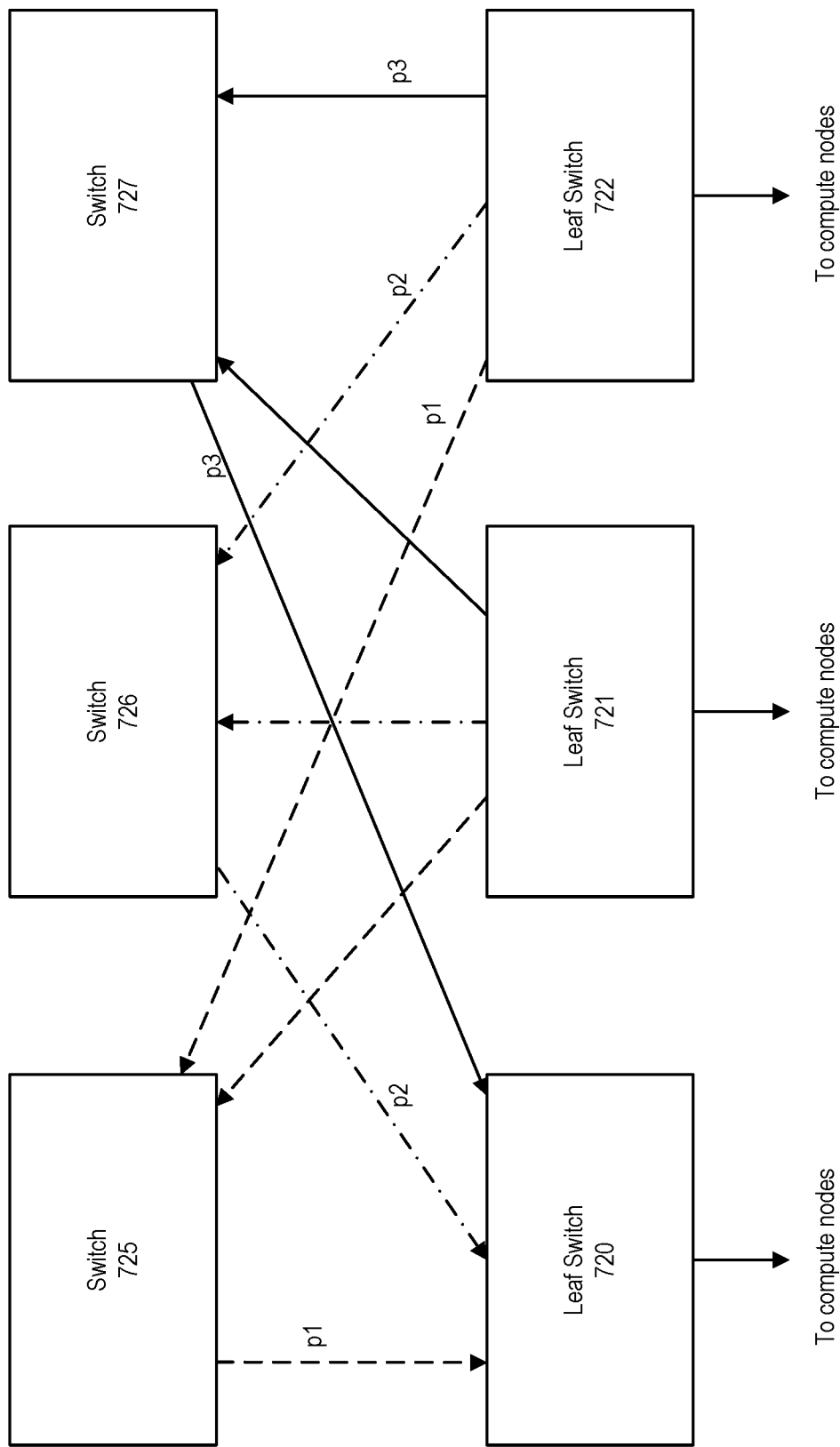
FIG. 7 illustrates an exemplary fat-tree network showing path calculation and path assignment, in accordance with an embodiment.

FIG. 7 illustrates an exemplary fat-tree network showing path calculation and path assignment, in accordance with an embodiment. In a first phase, a routing mechanism can calculate paths towards leaf-switch 720. As there are three root switches in the topology, e.g., switch 725, switch 726, and switch 727, the routing mechanism can calculate three distinct paths towards leaf switch 720, one from each root switch. For each of these paths, p1, p2 and p3, the routing mechanism can calculate a complete spanning tree in the topology rooted at the selected root switch. Each of the spanning tree, shown with differently dashed/solid lines in FIG. 7, gives one complete set of routes from the other two leaf switches, leaf switch 721 and leaf switch 722, to leaf switch 720.

In accordance with an embodiment, for fat-trees with single link between switches (non-PGFTs), once a reverse path until a root switch has been selected for a leaf-switch, building spanning tree is trivial as there exists only one downward path from a selected root switch to each of the leaf-switches. For fat-trees with parallel links between switches, spanning trees can be calculated recursively by going-down at each level when selecting the reverse path up to the root level. The path calculation is done without considering the compute nodes attached to the leaf switches. The number of the available distinct multipaths towards each leaf-switch depends on the topology.

Figure 8:
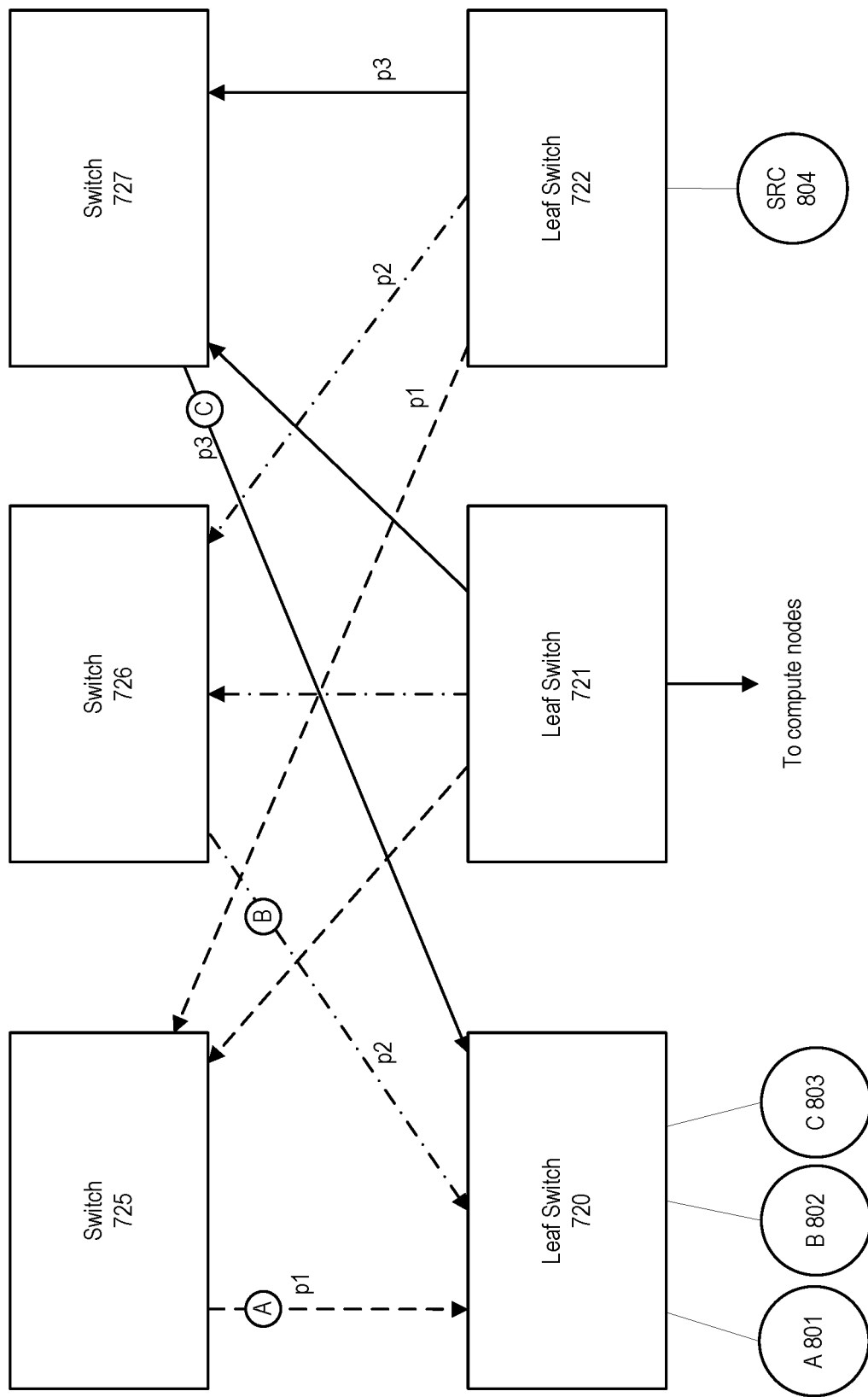
FIG. 8 illustrates an exemplary fat-tree network showing path calculation and path assignment, in accordance with an embodiment.

In accordance with an embodiment, in a second phase, the calculated paths for the leaf switches are assigned to the compute nodes according to the routing logic. FIG. 8 illustrates an exemplary fat-tree network showing path calculation and path assignment, in accordance with an embodiment. As depicted in FIG. 8, the routing mechanism can assign the paths as follows: path p1 can be assigned to node A 801, path p2 can be assigned to node B 802, and path p3 can be assigned to node C 803. Because of this, node SRC 804, which is connected to leaf switch 722, can send traffic on the designated paths to reach corresponding compute nodes on leaf switch 720 (i.e., node A 801, node B 802, and/or node C 803). For example, a packet from node SRC 804 directed to node B 802 will take path p2 to reach node B, following the path leaf switch 722, to root switch 726, to leaf switch 720. At a later time, to change path towards node B to p1, the algorithm can alter the path assignment of node B from p2 to p1, without going through path re-calculation phase, and reinstall new LFTs. In current/standard fat-tree routing algorithms, such a change would need complete re-routing due to a change in the indexing order of the nodes.

In accordance with an embodiment, a number of distinct paths possible towards each leaf switch can be calculated, creating spanning trees in the fat-tree. As an example, starting with an XGFT (Extended Generalized Fat-Trees), which is a fat tree with h+1 level nodes. Levels are denoted from 0 to h, with compute nodes at the lowest level 0, and switches at all other levels. Except for the compute nodes that do not have children, all nodes at level i, $1 \leq i \leq h$, have $m_i$ child nodes. Similarly, except for the root switches that do not have parents, all other nodes at level i, $0 \leq i \leq h-1$, have $w_i+1$ parent nodes.

In accordance with an embodiment, a fully populated XGFT has $\Pi_{l=1}^{h} m_l$ compute nodes at level 0, and $\Pi_{l=i+1}^{h} m_l \times \Pi_{l=1}^{i} w_l$ switches at any level i, $1 \leq i \leq h$. Each node at level i has $w_{i+1}$ up-going ports and $m_i$ down-going ports. Accordingly, the maximum level of leaf switches at level 1 are $\Pi_{l=2}^{h} m_l \times w_l$. Similarly, the total number of root switches at level h are $\Pi_{l=1}^{h} w_l$.

In accordance with an embodiment, the routing between any source (S) and destination (D) in an XGFT consists of two phases. First, the selection of an upward path to reach one of the nearest common ancestors (NCAs) of S and D, and second, a unique downward path from the selected NCA to the destination D. If the NCAs between the nodes are at level k, $1 \leq k \leq h$, then there are $\Pi_{i=1}^{k} w_i$ shortest paths available between the nodes.

In accordance with an embodiment, two types of spanning tree sets can be defined, each defining a distinct path to a particular leaf-switch in an XGFT from all the other leaf switches in the topology. First, a spanning tree set that contains different spanning trees; whereas a spanning tree is said to be different from another if there exists at least one different communication link between the two. Second, a disjoint spanning tree set that contains only those spanning trees that have no common communication link between the paths.

In accordance with an embodiment, as by definitions above, from each root switch in an XGFT, there exists a distinct path to all the leaf switches. The spanning trees rooted at all the root switches are different from one another in at least one link joining root switches to the switches at level h−1. So, there are as many different spanning trees as there are number of root switches in an XGFT. However, not all these spanning trees are disjoint. There are a different number of parent nodes at each level in an XGFT; the level which has least number of parent nodes define the limit for the distinct spanning trees. This is because above that number, the spanning tree would always have a link shared at that limiting level.

Metabase-Aided Fat-Tree Routing and Reconfiguration

In accordance with an embodiment, the pseudo-code of a metabase-aided fat-tree routing and reconfiguration mechanism is here:

---
MetabaseAidedRouting

1: if reconfiguration due to a topology change then
2:   Phase I: Calculate n leaf-switch multipaths
3:   Phase II: Call routing function using calculated paths
4:   Save calculated paths in a metabase
5: else {performance-based reconfiguration}
6:   // Phase I is not needed
7:   Load paths metabase
8:   Phase II: Call routing function using loaded paths
9: end if
10: for each switch do
11:   Update LFTs
12: end for
---

Figure 9:
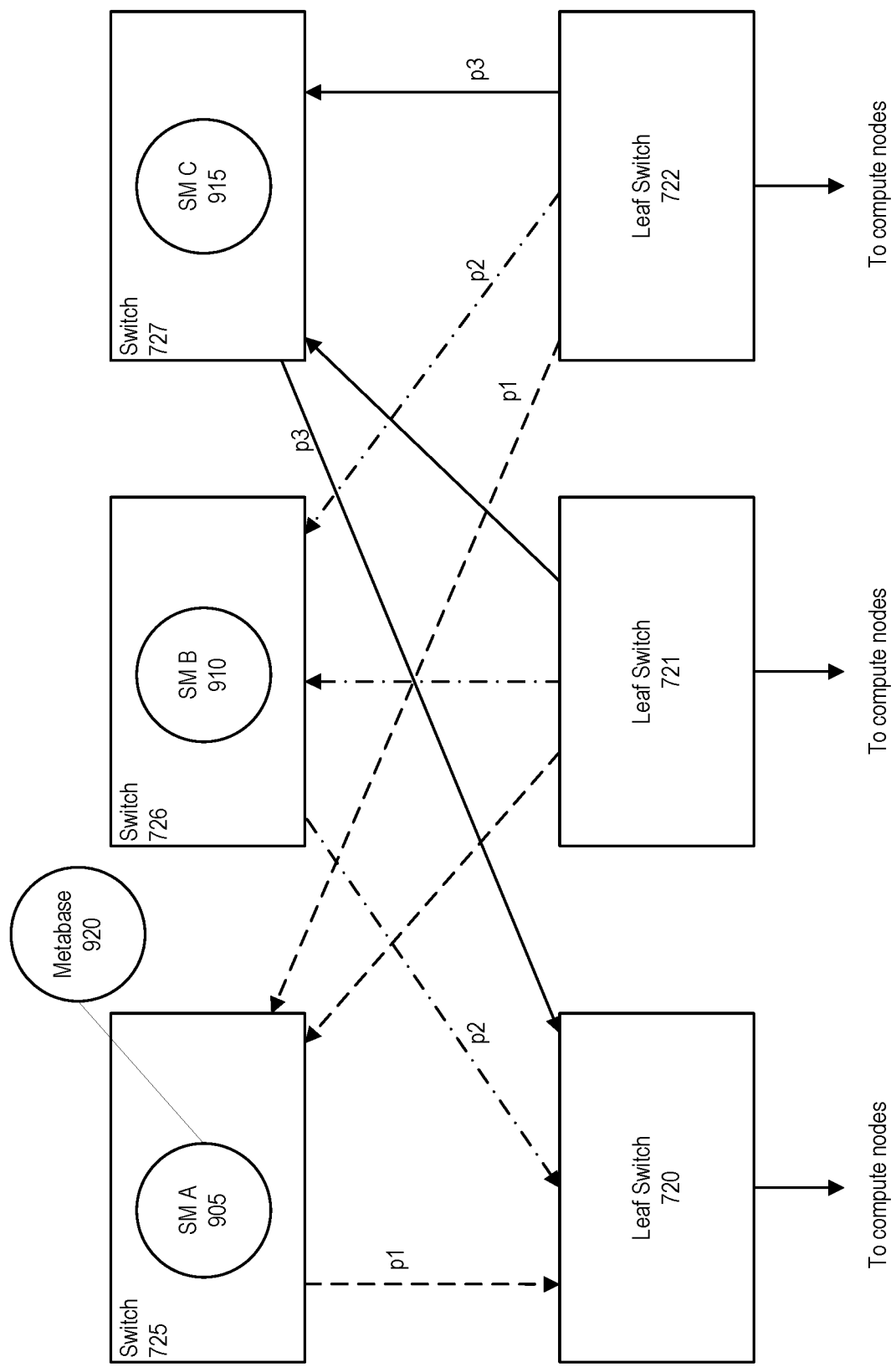
FIG. 9 illustrates an exemplary fat-tree network showing metabase-aided fat-tree routing, in accordance with an embodiment.

FIG. 9 illustrates an exemplary fat-tree network showing metabase-aided fat-tree routing, in accordance with an embodiment. FIG. 9 depicts an exemplary subnet that comprises six switches, switches 725-727 and root switches 720-722. Additionally, various subnet managers can reside on various subnet devices, such as on the switches. For example, subnet manager A 905 can reside on switch 725, subnet manager B 910 can reside on switch 726, and subnet manager C 915 can reside on switch 727. In the example depicted in FIG. 9, subnet manager A 905 has been designated as the master subnet manager.

In accordance with an embodiment, in a first phase, the master subnet manager, subnet manager A 905, can calculate paths towards leaf-switch 720. As there are three root switches in the topology, e.g., switch 725, switch 726, and switch 727, three distinct paths can be calculated towards leaf switch 720, one from each root switch. For each of these paths, p1, p2 and p3, the routing mechanism can calculate a complete spanning tree in the topology rooted at the selected root switch. Each of the spanning trees, shown with differently dashed/solid lines in FIG. 9, gives one complete set of routes from the other two leaf switches, leaf switch 721 and leaf switch 722, to leaf switch 720. After calculating the paths towards leaf-switch 720, the master subnet manager A 905 can store the paths in metabase 920. Such path information can be considered metadata relative to the current topology data that the master subnet manager is maintaining based on the discovered connectivity within the subnet.

In accordance with an embodiment, the metabase 920 can be one or more additional data structures maintained by the master subnet manager. Although the metabase 920 is shown as being separate from the master subnet manager in FIG. 9, the metabase can also be considered as a component directly associated with the master subnet manager. For example, the metabase can comprise virtual memory structures dynamically allocated by the master subnet manager during the initial routing, or the metabase could be based on external persistent file or database storage that is accessible to the master subnet manager. When the metabase is stored persistently, the information could be available to the master subnet manager across subnet manager restarts as long as the subnet topology is still matching.

In accordance with an embodiment, the metabase can be available to the master subnet manager without depending on the master subnet manager initializing the subnet (e.g., an InfiniBand subnet).

In accordance with an embodiment, if a reconfiguration is requested by a subnet manager due to a topology change (e.g., a link goes down), the master subnet manager can proceed with calculating multipath spanning trees towards all leaf-switches, and proceeds with calling the routing function with the calculated paths as an input. The routing function uses already calculated paths and assigns them to the compute nodes. The paths are then stored in a metabase.

In accordance with an embodiment, for performance-based reconfigurations (i.e., those reconfigurations not based upon a topology change), the paths metabase is loaded by the master subnet manager, and the routing of compute nodes is done based on already calculated leaf-switch to leaf-switch multipaths. Once the new LFTs have been calculated, the mechanism proceeds with updating LFTs on each switch using differential update mechanism using SM as usual.

In accordance with an embodiment, the logic of allocating calculated paths to the actual compute node destinations is up to the routing mechanism. The path calculation phase, however, can be equipped with generating only a limited number of leaf-switch spanning tree paths (given by n in MetabaseAidedRouting, line 2), or generate only those paths making link-disjoint spanning trees in the topology. Moreover, if the topology is oversubscribed having more compute nodes attached to each leaf-switch than the available different spanning trees in the fat-tree network, the routing mechanism can assign multiple compute nodes to the same paths.

Network Reconfiguration Based on Node Ordering

In accordance with an embodiment, node ordering can play an important role in determining the paths for compute nodes in a fat-tree topology. When the node ordering is updated, a new set of LFTs is calculated by the routing mechanism. Statically-routed networks are prone to significant reduction in effective bandwidth when routing is not optimized for a given node permutation. Even if there is no change in the topology and network links, the performance of the running applications is affected if the routing is not reconfigured for the current node permutation. This is particularly important when only a subset of the total nodes participate in running an application. To achieve optimal bandwidth, it is important to configure routing according to the node order (also called MPI node rank) before running an application.

In accordance with an embodiment, the fat-tree routing mechanism routes nodes in the order of indexing, which depends on the leaf switch discovery order and the port number of the leaf switch to which the node is connected. However, it is not always practical to rank MPI processes according to the indexing order of the nodes in the fat tree routing. As a result, application performance becomes unpredictable. The SlimUpdate routing mechanism can preserve the node order according to the initial routing scheme, however, as it is designed for generalized reconfiguration scenarios including fault-tolerance, it takes more time to reconfigure the network.

In accordance with an embodiment, a modified SlimUpdate routing mechanism can be utilized for the performance-based reconfigurations to optimize routing for a given node ordering. The modified mechanism can use a metabase-aided routing scheme to quickly generate a new set of LFTs when the node ordering sequence is changed.

In accordance with an embodiment, the SlimUpdate routing mechanism for performance based reconfigurations requires that the leaf-switch to leaf-switch multipaths metabase has been created. It also requires an application node ordering (e.g., based on MPI node ranks), which is used to reassign calculated paths to the compute nodes, to optimize routing for the given node order.

The pseudo code of the metabase-aided Slim Update routing mechanism is given here:

---

SlimUpdate Routing for Node Order-Based Reconfiguration

Require: Leaf-to-Leaf Multipaths metabase has been created
Require: No topology change from the last run
Require: Application node ordering
Ensure: The LFTs are updated for the switches
1: metabase ← load_paths metabase( )
2: for each leaf_sw ∈ leafSwitches[ ] do
3:     new_node_order ← get_node_ordering(leaf_sw)
4:     Sort compute nodes by new_node_order
5:     for each cn ∈ computeNodes[ ] do
6:         Get lid of cn
7:         path id ← metabase.get_next_path(leaf_sw)
8:         for each sw ∈ Switches[ ] do
9:             if sw ≠ leaf_sw then
10:                sw.LFT$_{new}$[lid] ⇐ path_id.get_sw_port(sw)
11:            end if
12:        end for
13:    end for
14: end for
15: Update LFTs using differential update mechanism

---

In accordance with an embodiment, the mechanism first loads the calculated multipaths metabase (see line 1 of the above pseudo code for SlimUpdate Routing for Node Order-Based Reconfiguration). Once the metabase is loaded, for each leaf switch, the mechanism can sort compute nodes according to the new node order provided as an input to the routing mechanism (see line 4 of the above pseudo code for Slim Update Routing for Node Order-Based Reconfiguration). The mechanism can then proceed with iterating through all the compute nodes attached to the leaf switch. For each compute node, the mechanism can select a path id from the metabase based on the leaf-switch (see line 7 of the above pseudo code for SlimUpdate Routing for Node Order-Based Reconfiguration), which is stored in a sequential order. The path id is used to update LFTs of all the switches based on the port prescribed in the selected path (see lines 8-12 of the above pseudo code for SlimUpdate Routing for Node Order-Based Reconfiguration). When all new LFTs have been generated, the SM can use a differential update mechanism to update LFTs on all the switches.

Figure 10:
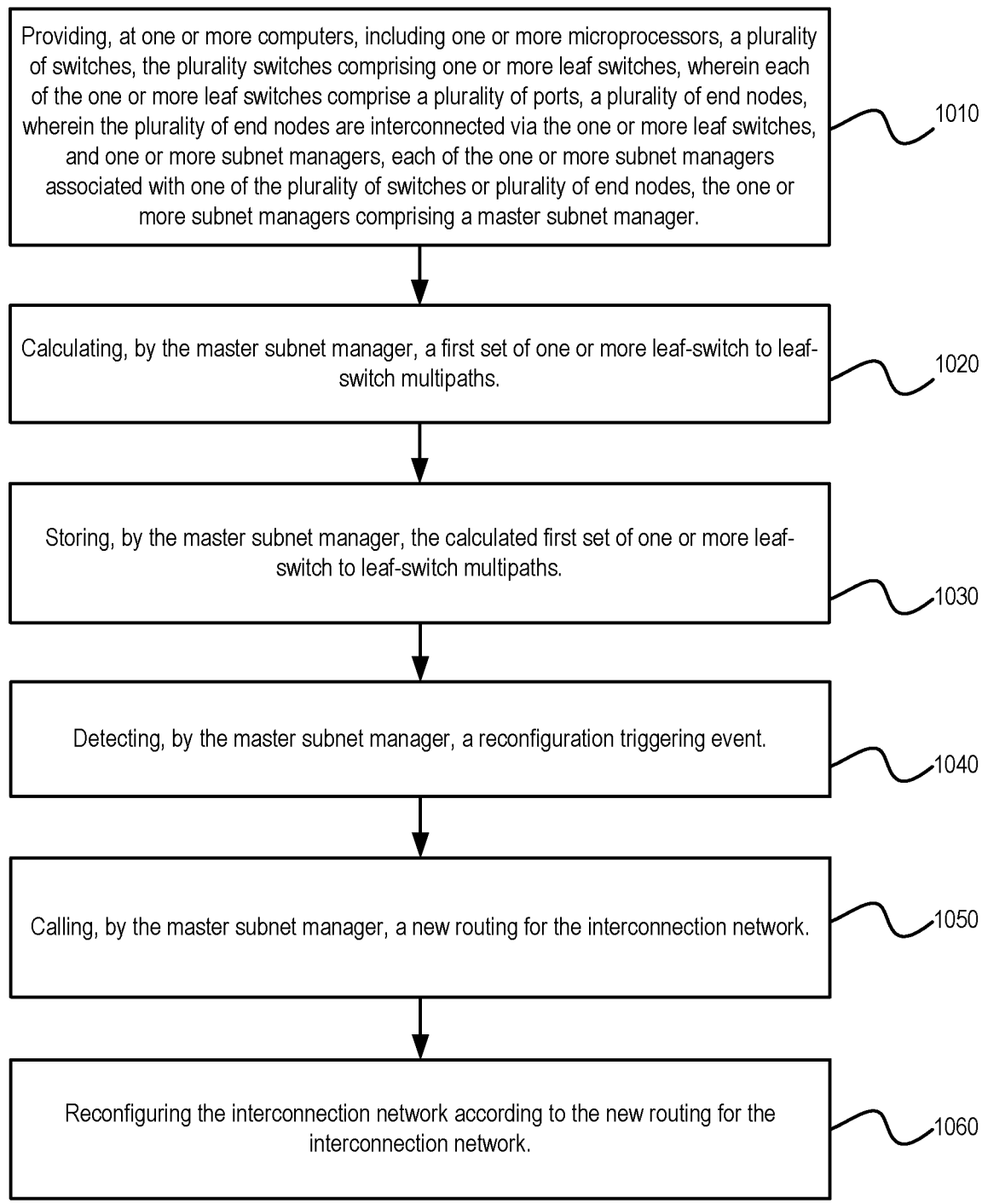
FIG. 10 is a flow chart of an exemplary method for supporting efficient reconfiguration of an interconnection network having a pre-existing routing comprising, in accordance with an embodiment.

FIG. 10 is a flow chart of an exemplary method for supporting efficient reconfiguration of an interconnection network having a pre-existing routing comprising, in accordance with an embodiment.

At step 1010, the method can provide, at one or more computers, including one or more microprocessors, a plurality of switches, the plurality switches comprising one or more leaf switches, wherein each of the one or more leaf switches comprise a plurality of ports, a plurality of end nodes, wherein the plurality of end nodes are interconnected via the one or more leaf switches, and one or more subnet managers, each of the one or more subnet managers associated with one of the plurality of switches or end nodes, the one or more subnet managers comprising a master subnet manager.

At step 1020, the method can calculate, by the master subnet manager, a first set of one or more leaf-switch to leaf-switch multipaths.

At step 1030, the method can store, by the master subnet manager, the calculated first set of one or more leaf-switch to leaf-switch multipaths.

At step 1040, the method can detect, by the master subnet manager, a reconfiguration triggering event At step 1050, the method can call, by the master subnet manager, a new routing for the interconnection network.

At step 1060, the method can reconfigure the interconnection network according to the new routing for the interconnection network.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting efficient reconfiguration of an interconnection network having a pre-existing routing comprising:
   providing one or more computers, wherein each of computer comprises one or more microprocessors;
   providing a network at the one or more computers, the network comprising:
      a plurality of switches, each switch comprising a linear forwarding table, of a plurality of linear forwarding tables, each linear forwarding table being configured according to the pre-existing routing, the plurality of switches comprising a plurality of leaf switches,
      a subnet manager, the subnet manager running on one of the plurality of switches, and
      a metabase accessible by the subnet manager, the metabase storing a first set of calculated leaf-switch to leaf-switch multipaths;
   detecting, by the subnet manager, a reconfiguration triggering event in the network, the reconfiguration triggering event comprising an event other than a topology change;
   distributing, by the subnet manager, at least one multipath of the first set of one or more leaf-switch to leaf-switch multipaths to the plurality of switches;
   updating, by the subnet manager, a linear forwarding table of a switch of the plurality of switches according to the distributed at least one multipath of the first set of one or more leaf-switch to leaf-switch multipaths.

2. The method of claim 1, further comprising:
updating, by the subnet manager, each of the plurality of linear forwarding tables according to the distributed at least one multipath of the calculated first set of one or more leaf-switch to leaf-switch multipaths.

3. The method of claim 2, wherein said updating of each of the plurality of linear forwarding tables is performed in parallel.

4. The method of claim 1, further comprising:
detecting, by the subnet manager, a second reconfiguration triggering event in the network, the second reconfiguration triggering event comprising a change in a topology of the network.

5. The method of claim 4, wherein the topology change of the interconnection network comprises one of node failure and link failure.

6. The method of claim 5, further comprising:
calculating, by the subnet manager, a second set of one or more leaf-switch to leaf-switch multipaths, the second set of one or more leaf-switch to leaf-switch multipaths being associated with the topology change of the interconnection network; and
storing, by the subnet manager, the calculated second set of leaf-switch to leaf-switch multipaths at the metabase.

7. The method of claim 6, further comprising:
distributing, by the subnet manager, at least one multipath of the calculated second set of one or more leaf-switch to leaf-switch multipaths to the plurality of switches;
updating, by the subnet manager, the linear forwarding table of the switch of the plurality of switches according to the distributed at least one multipath of the calculated second set of one or more leaf-switch to leaf-switch multipaths.

8. A system for supporting efficient reconfiguration of an interconnection network having a pre-existing routing comprising:
one or more computers which each include one or more microprocessors; and
a network, the network comprising:
a plurality of switches, each switch comprising a linear forwarding table, of a plurality of linear forwarding tables, each linear forwarding table being configured according to the pre-existing routing, the plurality of switches comprising a plurality of leaf switches,
a subnet manager, the subnet manager running on one of the plurality of switches, and
a metabase accessible by the subnet manager, the metabase storing a first set of calculated leaf-switch to leaf-switch multipaths;
wherein the subnet manager detects a reconfiguration triggering event in the network, the reconfiguration triggering event comprising an event other than a topology change;
wherein the subnet manager distributes at least one multipath of the first set of one or more leaf-switch to leaf-switch multipaths to the plurality of switches;
wherein a linear forwarding table of a switch of the plurality of switches is updated, by the subnet manager, according to the distributed at least one multipath of the first set of one or more leaf-switch to leaf-switch multipaths.

9. The system of claim 8,
wherein each of the plurality of linear forwarding tables is updated, by the subnet manager, according to the distributed at least one multipath of the calculated first set of one or more leaf-switch to leaf-switch multipaths.

10. The system of claim 9, wherein said updating of each of the plurality of linear forwarding tables is performed in parallel.

11. The system of claim 8:
wherein the subnet manager detects a second reconfiguration triggering event in the network, the second reconfiguration triggering event comprising a change in a topology of the network.

12. The system of claim 11, wherein the topology change of the interconnection network comprises one of node failure and link failure.

13. The system of claim 12:
wherein a second set of one or more leaf-switch to leaf-switch multipaths is calculated bar the subnet manager, the second set of one or more leaf-switch to leaf-switch multipaths being associated with the topology change of the interconnection network; and
wherein the calculated second set of leaf-switch to leaf-switch multipaths is stored, by the subnet manager, at the metabase.

14. The system of claim 13:
wherein the subnet manager distributes at least one multipath of the calculated second set of one or more leaf-switch to leaf-switch multipaths to the plurality of switches;
wherein the linear forwarding table of the switch of the plurality of switches is updated, by the subnet manager, according to the distributed at least one multipath of the calculated second set of one or more leaf-switch to leaf-switch multipaths.

15. A non-transitory computer readable storage medium having instructions thereon for supporting efficient reconfiguration of an interconnection network having a pre-existing routing, which when read an executed cause a computer to perform steps comprising:
providing one or more computers, wherein each of computer comprises one or more microprocessors;
providing a network, the network comprising:
a plurality of switches, each switch comprising a linear forwarding table, of a plurality of linear forwarding tables, each linear forwarding table being configured according to the pre-existing routing, the plurality of switches comprising a plurality of leaf switches,
a subnet manager, the subnet manager running on one of the plurality of switches, and
a metabase accessible by the subnet manager, the metabase storing a first set of calculated leaf-switch to leaf-switch multipaths;
detecting, by the subnet manager, a reconfiguration triggering event in the network, the reconfiguration triggering event comprising an event other than a topology change;
distributing, by the subnet manager, at least one multipath of the first set of one or more leaf-switch to leaf-switch multipaths to the plurality of switches;
updating, by the subnet manager, a linear forwarding table of a switch of the plurality of switches according to the distributed at least one multipath of the first set of one or more leaf-switch to leaf-switch multipaths.

16. The non-transitory computer readable storage medium of claim 15, the steps further comprising:
updating, by the subnet manager, each of the plurality of linear forwarding tables according to the distributed at least one multipath of the calculated first set of one or more leaf-switch to leaf-switch multipaths;

wherein said updating of each of the plurality of linear forwarding tables is performed in parallel.

17. The non-transitory computer readable storage medium of claim 15, the steps further comprising:

detecting, by the subnet manager, a second reconfiguration triggering event in the network, the second reconfiguration triggering event comprising a change in a topology of the network.

18. The non-transitory computer readable storage medium of claim 17, wherein the topology change of the interconnection network comprises one of node failure and link failure.

19. The non-transitory computer readable storage medium of claim 18, the steps further comprising:

calculating, by the subnet manager, a second set of one or more leaf-switch to leaf-switch multipaths, the second set of one or more leaf-switch to leaf-switch multipaths being associated with the topology change of the interconnection network; and storing, by the subnet manager, the calculated second set of leaf-switch to leaf-switch multipaths at the metabase.

20. The non-transitory computer readable storage medium of claim 19, the steps further comprising:

distributing, by the subnet manager, at least one multipath of the calculated second set of one or more leaf-switch to leaf-switch multipaths to the plurality of switches;

updating, by the subnet manager, the linear forwarding table of the switch of the plurality of switches according to the distributed at least one multipath of the calculated second set of one or more leaf-switch to leaf-switch multipaths.

\* \* \* \* \*

UNITED STATES PATENT AND TRADEMARK OFFICE
CERTIFICATE OF CORRECTION

Page 1 of 2

PATENT NO. : 10,951,464 B2
APPLICATION NO. : 16/717166
DATED : March 16, 2021
INVENTOR(S) : Zahid et al.

It is certified that error appears in the above-identified patent and that said Letters Patent is hereby corrected as shown below:

In the Specification

In Column 1, Line 14, delete "2015," and insert -- 2016, --, therefor.

In Column 3, Line 60, after "accordingly" insert -- . --.

In Column 7, Line 44, delete "2 k" and insert -- 2k --, therefor.

In Column 8, Line 30, delete "An" and insert -- an --, therefor.

In Column 9, Line 50, delete "fat tree" and insert -- fat-tree --, therefor.

In Column 10, Line 34, delete ""Slim Update" and insert -- "SlimUpdate --, therefor.

In Column 10, Line 35, delete ""Slim Update")" and insert -- "SlimUpdate") --, therefor.

In Column 10, Lines 53-54, delete "Slim Update" and insert -- SlimUpdate --, therefor.

In Column 10, Line 65, delete "Slim Update)" and insert -- SlimUpdate) --, therefor.

In Column 13, Line 57, delete "$\pi_{i=1}^{h} m_1$" and insert -- $\pi_{l=1}^{h} m_l$ --, therefor.

In Column 13, Line 58, delete "$w=_1$" and insert -- $w_1$ --, therefor.

In Column 16, Line 10, delete "fat tree" and insert -- fat-tree --, therefor.

In Column 16, Line 30, delete "Slim Update" and insert -- SlimUpdate --, therefor.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*

In Column 16, Line 59, delete "Slim Update" and insert -- SlimUpdate --, therefor.

In Column 17, Line 27, after "event" insert -- . --.